United States Patent [19]

Back et al.

[11] Patent Number: 4,502,865
[45] Date of Patent: Mar. 5, 1985

[54] FIBRE-REACTIVE CHROMIUM COMPLEX DYES, PROCESS FOR THEIR MANUFACTURE AND USE THEREOF TO DYE CELLULOSE OR WOOL

[75] Inventors: Gerhard Back, Lörrach, Fed. Rep. of Germany; Fabio Beffa, Riehen; Hans-Ulrich Schütz, Basel, both of Switzerland

[73] Assignee: Ciba-Geigy Corporation, Ardsley, N.Y.

[21] Appl. No.: 557,715

[22] Filed: Dec. 2, 1983

Related U.S. Application Data

[60] Division of Ser. No. 199,789, Oct. 23, 1980, Pat. No. 4,432,898, which is a continuation of Ser. No. 971,140, Dec. 19, 1978, abandoned, which is a continuation of Ser. No. 805,754, Jun. 13, 1977, abandoned.

[30] Foreign Application Priority Data

Jun. 24, 1976 [DE] Fed. Rep. of Germany ....... 8086/76
Mar. 14, 1977 [CH] Switzerland ........................ 3153/77

[51] Int. Cl.$^3$ ................... C09B 45/16; C09B 62/50; D06P 1/38; D06P 3/14
[52] U.S. Cl. .......................... 8/543; 8/685; 8/696; 8/917; 8/918; 534/696; 534/698
[58] Field of Search ............... 8/543, 685, 696

[56] References Cited

U.S. PATENT DOCUMENTS

| | | | |
|---|---|---|---|
| 2,943,084 | 6/1960 | Buehler et al. ................. | 260/145 B |
| 2,943,085 | 6/1960 | Oesterlein ....................... | 8/549 |
| 3,308,114 | 3/1967 | Blackhall ........................ | 8/543 |
| 3,412,081 | 11/1968 | Ackermann .................... | 8/681 |
| 3,463,771 | 8/1969 | Benz et al. ..................... | 8/549 |
| 3,869,440 | 3/1975 | Back et al. ..................... | 8/543 |
| 4,105,400 | 8/1978 | Back ............................... | 8/467 |

FOREIGN PATENT DOCUMENTS 1444691  11/1972  Fed. Rep. of Germany .
501715  2/1971  Switzerland .

Primary Examiner—A. Lionel Clingman
Attorney, Agent, or Firm—Edward McC. Roberts

[57] ABSTRACT

Novel chromium complex dyes are disclosed which have the formula

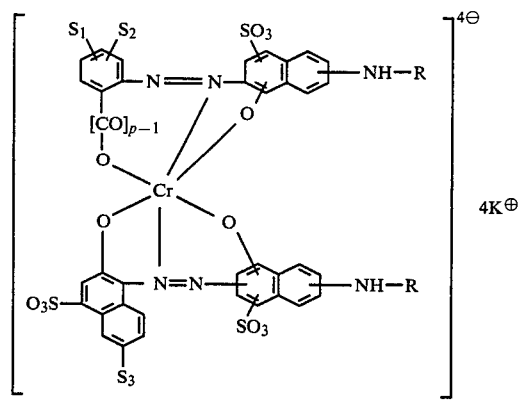

wherein
$S_1$ represents a hydrogen or halogen atom, a nitro group, a sulpho group, an alkyl or alkoxy radical, an acylamino or arylazo group,
$S_2$ represents a hydrogen or halogen atom, a nitro group, a sulpho group, an alkyl or alkoxy radical,
$S_3$ represents a hydrogen atom, a nitro group or a halogen atom,
P is 1 or 2,
R represents a fluorochloropyrimidyl or fluorotriazinyl radical, a chloroacetyl, bromoacetyl, α-chloro- or α-bromoacryloyl radical or an α,β-dichloro- or α,β-dibromopropionyl radical, and
$K^\oplus$ represents a cation.

4 Claims, No Drawings

FIBRE-REACTIVE CHROMIUM COMPLEX DYES, PROCESS FOR THEIR MANUFACTURE AND USE THEREOF TO DYE CELLULOSE OR WOOL

This is a divisional of application Ser. No. 199,789 filed on Oct. 23, 1980, now U.S. Pat. No. 4,432,898 which in turn is a continuation of application Ser. No. 971,140, filed on Dec. 19, 1978, now abandoned, which in turn is a continuation of application Ser. No. 805,754, filed June 13, 1977, now abandoned.

The invention relates to chromium complex dyes of the formula

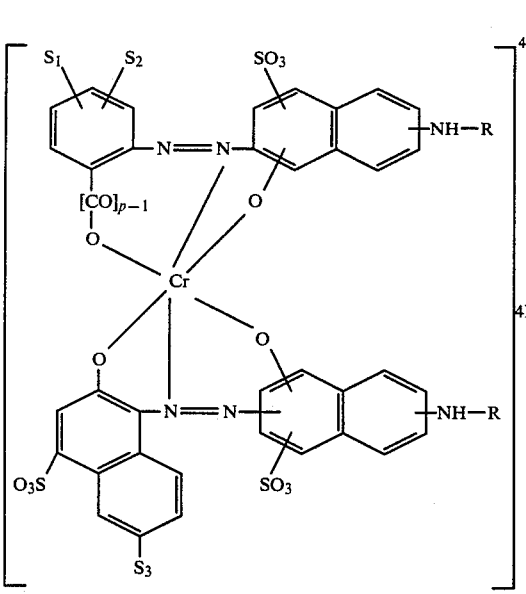

wherein $S_1$ represents a hydrogen or halogen atom, a nitro group, a sulpho group, an alkyl or alkoxy radical, an acylamino or arylazo group, $S_2$ represents a hydrogen or halogen atom, a nitro group, a sulpho group, an alkyl or alkoxy radical, $S_3$ represents a hydrogen atom, a nitro group or a halogen atom, p is 1 or 2, R represents a fluorochloropyrimidyl or fluorotriazinyl radical, a chloroacetyl, bromoacetyl, α-chloro- or α-bromoacryloyl radical or an α,β-dichloro- or α,β-dibromopropionyl radical, and $K^\oplus$ represents a cation.

The term "halogen" is to be understood as meaning herein fluorine, bromine and, preferably, chlorine atoms, and the terms "alkyl" and "alkoxy" comprise in particular low molecular radicals, i.e. alkyl and alkoxy radicals each having 1 to 4 carbon atoms. The term "acylamino" denotes herein in particular alkanoylamino and alkoxycarbonylamino groups, wherein the hydrocarbon radical contains 1 to 4 carbon atoms, for example acetylamino or ethoxycarbonylamino groups. Possible arylazo groups are naphthyl and preferably phenylazo groups which can be substituted for example by sulpho, chlorine, bromine, methyl, methoxy or nitro.

The dyes of the present invention are obtained by reacting one of the azo dyes of the formulae

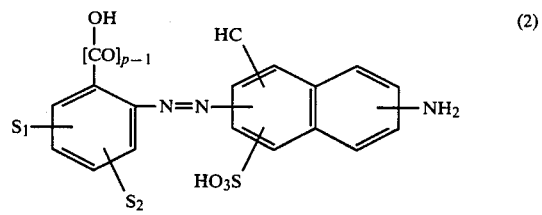

and

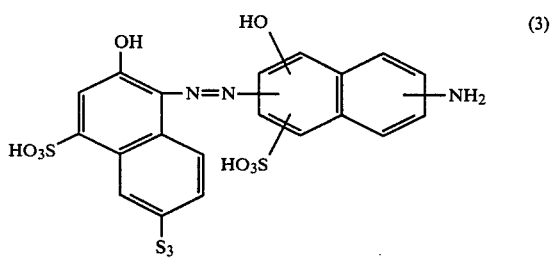

with a chromium donor to give the 1:1 chromium complex and reacting this latter with the other azo dye of the above formulae to give the 1:2 chromium complex and, before or after the chroming, reacting the $NH_2$ groups of the compounds of the formulae (2) and (3) with an acylating agent which affords the radical R.

It is preferable to prepare firstly the 1:2 chromium complex of the azo dyes of the formulae (2) and (3), and then to react this compound with an acylating agent which affords the radical R.

In particular, the starting material is a chromium complex of the formula

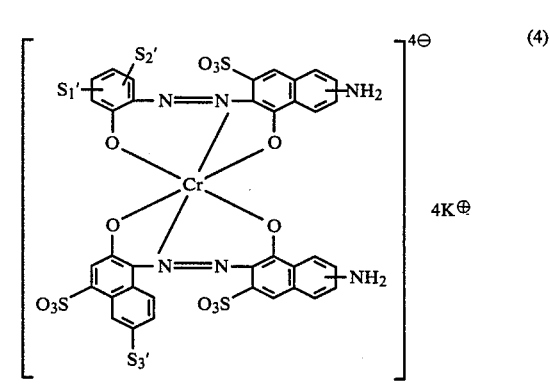

wherein $S_1'$ represents a nitro group, a chlorine atom, a sulpho or sulphophenylazo group, an alkyl or alkoxy radical, an alkanoylamino or alkoxycarbonylamino group, $S_2'$ represents a hydrogen or chlorine atom, a nitro group, a sulpho group, or a lower molecular alkyl or alkoxy radical, $S_3'$ represents a hydrogen atom or a nitro group, and $K^\oplus$ represents a cation, or is a chromium complex of the formula

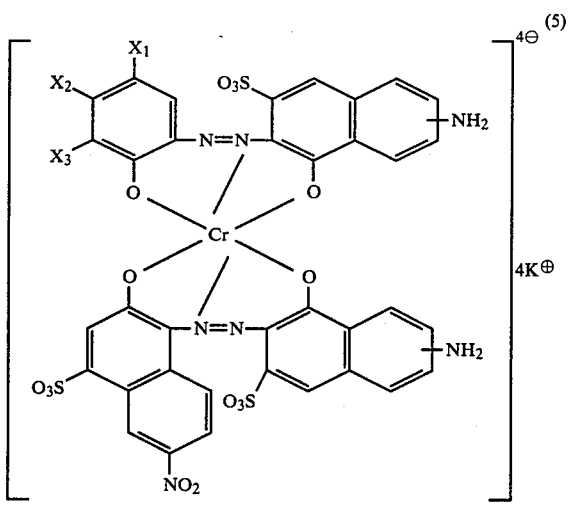

(5)

wherein K⊕ is as defined above, one of the symbols $X_1$, $X_2$ and $X_3$ represents, or any two represent, hydrogen, and the other two represent, or the third represents, chlorine, nitro, methyl, methoxy, or sulpho.

These chromium complexes are obtained by methods which are known per se. For example, the 1:1 chromium complex of the compound of the formula (3) is prepared by reacting the metal-free compound in acid medium with a salt of trivalent chromium such as chromium chloride, chromium fluoride or chromium sulphate. The 1:1 complex is subsequently reacted in neutral to weakly alkaline medium with a compound of the formula (2).

Examples of suitable diazo components for the azo compounds of the formula (2) are: anthranilic acid, 2-amino-1-hydroxybenzene, 4- or 5-chloro-2-amino-1-hydroxybenzene, 4- or 5-nitro-2-amino-1-hydroxybenzene, 4-methyl-2-amino-1-hydroxybenzene, 4-methoxy-2-amino-1-hydroxybenzene, 4,6-dichloro-2-amino-1-hydroxybenzene, 4,6-dinitro-2-amino-1-hydroxybenzene, 4-chloro-5-nitro-2-amino-1-hydroxybenzene, 4-chloro-6-nitro-2-amino-1-hydroxybenzene, 6-chloro-4-nitro-2-amino-1-hydroxybenzene, 6-nitro-4-methyl-2-amino-1-hydroxybenzene, 4-(m- or p-sulphophenylazo)-2-amino-1-hydroxybenzene, 4-nitro-2-aminophenol-6-sulphonic acid or 6-nitro-2-aminophenol-4-sulphonic acid.

The diazo components with nitro groups are preferred, especially 4- or 5-nitrophenol, and the mixtures thereof.

As coupling components aminonaphtholsulphonic acids are used, such as 1-amino-5-naphthol-7-sulphonic acid, 1-amino-8-naphthol-4-sulphonic acid, or 2-amino-6-naphthol-8-sulphonic acid, and preferably 2-amino-8-naphthol-6-sulphonic acid and 2-amino-5-naphthol-7-sulphonic acid.

Suitable acylating agents which afford the radical R are chloroacetyl chloride, bromoacetyl chloride, α,β-dichloro- or α,β-dibromopropionyl chloride, α-chloro- or α-bromoacrylyl chloride, 5-chloro-2,4,6-trifluoropyrimidine, 2,4,6-trifluorotriazine and fluorotriazine compounds of the formula wherein Z represents a removable radical, in particular a fluorine atom, and $R_1$ represents a substituted or unsubstituted amino group or a free or etherified oxy or thio group, for example the $NH_2$ group, an amino group which is mono- or disubstituted by $C_1$–$C_4$-alkyl radicals; a $C_1$–$C_4$-alkoxy radical, a $C_1$–$C_4$-alkylmercapto group, an arylamino group, in paticular phenylamino group, or a phenylamino, phenoxy, mono- or disulphophenoxy group etc. which is substituted by methyl, methoxy, chlorine and, in particular, by sulpho.

Examples of such triazine compounds are: 2,4-difluoro-6-aminotriazine, 2,4-difluoro-6-methylaminotriazine, 2,4-difluoro-6-ethylaminotriazine, 2,4-difluoro-6-phenylaminotriazine, 2,4-difluoro-6-(2'-, 3'- or 4'-sulphophenyl)-aminotriazine, 2,4-difluoro-6-(2',4'- or 3',4'- or 2',5'- or 4',5'-disulphophenyl)-aminotriazine, 2,4-difluoro-6-dimethylaminotriazine, 2,4-difluoro-6-methoxytriazine, 2,4-difluoro-6-(β-methoxyethoxy)-triazine, 2,4-difluoro-6-methylmercaptotriazine, 2,4-difluoro-6-phenylmercapto-triazine.

The acylation is effected by methods which are known per se, for example by addition of the acylating agent to an aqueous solution of the 1:2 chromium complex in weakly acid to weakly alkaline medium, for example in the presence of sodium hydrogen carbonate.

Preferred acyl radicals are the α-bromoacryloyl and α,β-dibromopropionyl radical. The former can be introduced either with bromacrylyl chloride or be obtained from the α,β-dibromopropionyl radical by removal of hydrogen bromide. The same also applies in respect of the α-chloroacrylyl radical. The 4,6-difluorotriazinyl-(2) or 4-fluoro-6-alkyl- or -arylaminotriazinyl-(2) radicals are also of interest.

The novel dyes are suitable for dyeing and printing cellulose or natural protein material, in particular cotton and shrinkproofed (chlorinated) wool. They can also be used in the exhaustion process and in the padding and transfer printing process. In the two first named processes, the dyes are advantageously applied to the textile fabric from aqueous weakly acid liquors which contain a levelling agent. The transfer printing is effected by transferring the dye by a heat treatment, in the presence of moisture, from a carrier to the textile fabric.

The dyeings and prints obtained are characterised by good fastness properties, such as lightfastness, fastness to rubbing and, above all, by good wetfastness properties, such as fastness to washing, fulling, perspiration, hot water and and moist heat. A particular advantage of the dyes of the present invention resides in the fact that they exhaust readily and build up to deep uniform dyeings—a property which is of great importance in effecting black dyeings.

In the following Examples, the parts and percentages are by weight.

EXAMPLE 1

53.4 Parts of the 1:1 chromium complex of the monoazo dye obtained in known manner for diazotised 6-nitro-1-amino-2-naphthol-4-sulphonic acid and 2- amino-5-naphthol-7-sulphonic acid are stirred with 44.9 parts of the monoazo dye from diazotised 4,6-dinitro-2-aminophenol and 2-amino-8-naphthol-6-sulphonic acid in 600 parts of hot water until homogeneity is obtained. The suspension is heated to a temperature of 90° to 95° C. and adjusted to a constant pH value of 8 to 8.5 by addition of a 2N sodium hydroxide solution, then stirred at this temperature until it is no longer possible to detect either of the two monoazo dyes in the resultant clear solution.

The deep black solution of the mixed complex is thereafter cooled to a temperature of 10° to 12° C. and 40 parts of sodium hydrogen carbonate are added. Then 29.5 parts of α,β-dibromopropionyl chloride are added dropwise, with stirring, in the course of an hour. The acylating solution is stirred, with attendant rise to room temperature, until no more free amino groups can be detected.

The novel dye of the following constitution

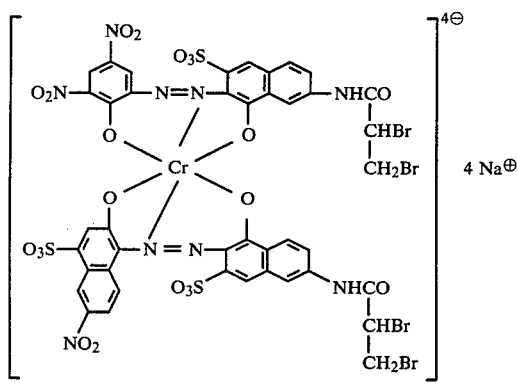

is isolated by evaporating the solution to dryness in vacuo at 60°–70° C. It is readily soluble in water and produces wet- and lightfast full black dyeings on shrinkproofed wool by the methods described subsequently in the dyeing procedures.

EXAMPLE 2

53.4 Parts of the 1:1 chromium complex of the monoazo dye from diazotised 6-nitro-1-amino-2-naphthol-4-sulphonic acid and 2-amino-5-naphthol-7-sulphonic acid are reacted with 39.35 parts of the monoazo dye from diazotised 4-chloro-2-aminophenol and 2-amino-8-naphthol-6-sulphonic acid in accordance with the particulars of Example 1 to give the corresponding homogeneous mixed complex, which is then acylated with 29.5 parts of α,β-dibromopropionyl chloride to give a reactive dye of analogous constitution. Wet- and lightfast full blue-black shades are produced with this dye on shrinkproofed wool by the methods described in the subsequent dyeing procedures.

EXAMPLE 3

53.4 Parts of the 1:1 chromium complex of the monoazo dye from diazotised 6-nitro-1-amino-2-naphthol-4-sulphonic acid and 2-amino-5-naphthol-7-sulphonic acid and 40.4 parts of the monoazo dye from diazotised 4-nitro-2-aminophenol and 2-amino-8-naphthol-6-sulphonic acid are suspended in 600 parts of water. The suspension is adjusted to a pH value of 8 to 9 by addition of a 2N sodium hydroxide solution and reacted to the homogeneous mixed complex by stirring for 1 hour at 90°–95° C. The acylation with α,β-dibromopropionyl chloride according to the particulars of Example 1 gives a reactive dye which dyes shrinkproofed wool in full black shades of very good wet- and lightfastness.

EXAMPLE 4

53.4 Parts of the 1:1 chromium complex of the monoazo dye described in Example 1 are reacted with 40.4 parts of the monoazo dye from diazotised 4-nitro-2-aminophenol and 1-amino-5-naphthol-7-sulphonic acid to give the homogeneous mixed complex, which is then acylated with α,β-dibromopropionyl chloride as described in Example 1. The acylating solution is cooled with the addition of ice to 3°–5° C., adjusted to a constant pH of 12 by addition of 5N sodium hydroxide solution and stirred for 1 hour. The clear solution is then neutralised with dilute hydrochloric acid and evaporated to dryness in vacuo at 60° to 70° C. to isolate the dye.

The novel dye of the constitution

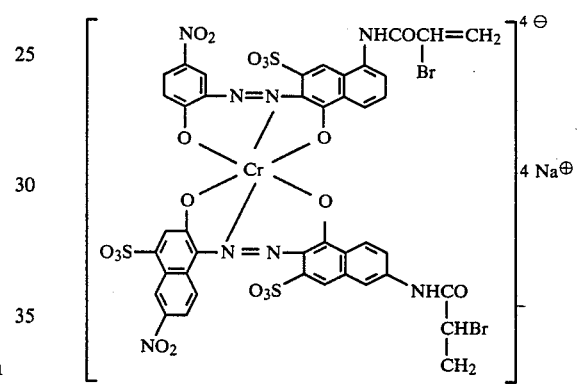

produces wet- and lightfast full violet-black dyeings on shrinkproofed wool by the methods described in the subsequent dyeing procedures.

EXAMPLE 5

53.4 Parts of the 1:1 chromium complex of the monoazo dye described in Example 1 are reacted with 46.1 parts of the monoazo dye from diazotised 4-nitro-6-acetylamino-2-aminophenol and 2-amino-6-naphthol-8-sulphonic acid to give the homogeneous mixed complex, which is acylated with α,β-dibromopropionyl chloride as in Example 1. The dye obtained after evaporation of the reaction solution dyes shrinkproofed wool in full black shades of very good wet- and lightfastness by the methods described in the subsequent dyeing procedures.

EXAMPLE 6

53.4 Parts of the 1:1 chromium complex of the monoazo dye described in Example 1 are reacted with 54.3 parts of the disazo dye from diazotised 4-(3'-sulphophenylazo)-2-aminophenol and 2-amino-5-naphthol-7-sulphonic acid in aqueous solution at pH 8 to 9 and 90° to 95° C. to give the homogeneous mixed complex. After acylation with 29.5 parts of α,β-dibromopropionyl chloride in accordance with Example 1, the novel dye of the formula

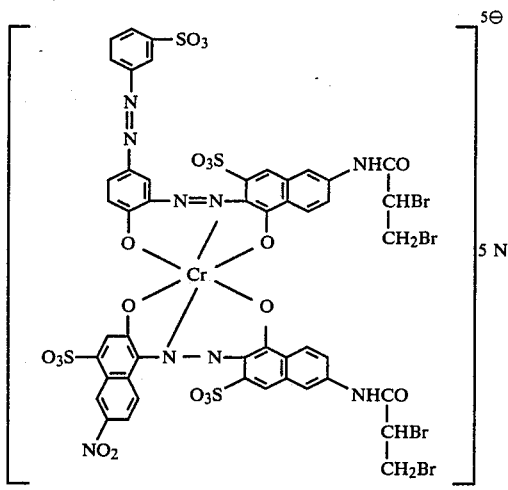

is precipitated from the solution by addition of potassium chloride, isolated by filtration and dried in vacuo at 60° to 70° C. Wet- and lightfast deep black dyeings are obtained on shrinkproofed woollen material.

A somewhat more greenish-black dye of the same colouristic properties is obtained by using 2-amino-8-naphthol-6-sulphonic acid as coupling component in the disazo dye.

EXAMPLE 7

48.7 Parts of the 1:1 chromium complex of the monoazo dye from diazotised 1-amino-2-naphthol-4-sulphonic acid and 2-amino-5-naphthol-7-sulphonic acid are stirred with 39.35 parts of the monoazo dye from diazotised 4-chloro-2-aminophenol and 2-amino-5-naphthol-7-sulphonic acid in 800 parts of hot water until homogeneity is attained. The suspension is heated to a temperature of 90° to 95° C. and adjusted to a pH value of 8 to 8.5 by addition of 2N sodium hydroxide solution, then stirred at this temperature until it is no longer possible to detect either of the two monoazo dyes in the resultant solution.

The dark blue solution of the mixed complex is then cooled to a temperature of 10° to 12° C. and at this temperature 29.5 parts of $\alpha,\beta$-dibromopropionyl chloride are added dropwise, with stirring, in the course of 1 hour while keeping the pH at 6.5 to 7.5 with 2N sodium hydroxide solution. The acylating solution is stirred with attendant rise in temperature until no more free amino groups can be detected. The dye of the following constitution

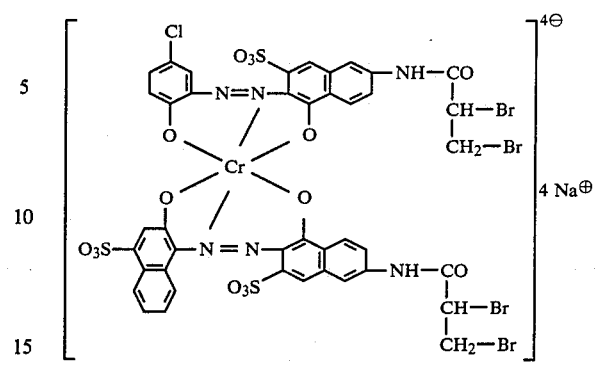

is precipitated by the addition of sodium chloride, then filtered off and dried. It is readily soluble in water and dyes chlorinated wool in wet- and lightfast navy blue shades by the methods described in the subsequent dyeing procedures.

EXAMPLE 8

48.7 Parts of the 1:1 chromium complex of the monoazo dye of Example 7 are reacted with 40.7 parts of the monoazo dye from diazotised 4-nitro-2-aminophenol and 2-amino-8-naphthol-6-sulphonic acid in aqueous solution at a pH of 8 to 9 and a temperature of 90° to 95° C. to give the homogeneous mixed complex. After acylation with 29.5 parts of $\alpha,\beta$-dibromopropionyl chloride according to Example 7, the novel dye of the formula

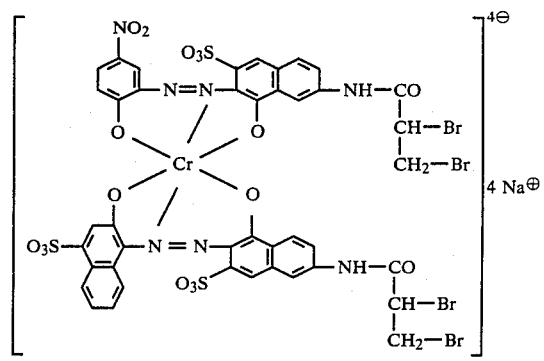

is precipitated from the solution by addition of sodium chloride, then filtered off and dried. Wet- and lightfast bluish-grey dyeings are obtained on shrinkproofed woollen material. Further dyes of this kind are obtained by reacting 1:1 chromium complexes of the monoazo dyes in column I of the table with the monoazo dyes in column II and acylating the mixed complexes with the acid chlorides in column III. Column IV indicates the shades obtained on shrinkproofed wool.

| No. | I | II | | III | IV |
|---|---|---|---|---|---|
| 1 | 6-nitro-1-amino-2-naphthol-4-sulphonic acid | 2-amino-5-naphthol-7-sulphonic acid | 5-nitro-2-aminophenol | 2-amino-8-naphthol-6-sulphonic acid | $\alpha,\beta$-dibromopropionyl chloride | black |
| 2 | 6-nitro-1-amino-2-naphthol-4-sulphonic acid | 2-amino-5-naphthol-7-sulphonic acid | 5-nitro-4-chloro-2-aminophenol | 2-amino-8-naphthol-6-sulphonic acid | $\alpha,\beta$-dibromopropionyl chloride | blue-black |
| 3 | 6-nitro-1-amino-2-naphthol-4- | 2-amino-5-naphthol-7- | 6-nitro-4-chloro-2-aminophenol | 2-amino-8-naphthol-6- | $\alpha,\beta$-dibromopropionyl | black |

-continued

| No. | I | II | | III | IV | |
|---|---|---|---|---|---|---|
| | sulphonic acid | sulphonic acid | | sulphonic acid | chloride | |
| 4 | 6-nitro-1-amino-2-naphthol-4-sulphonic acid | 2-amino-5-naphthol-7-sulphonic acid | 6-nitro-4-methyl-2-aminophenol | 2-amino-8-naphthol-6-sulphonic acid | α,β-dibromo-propionyl chloride | black |
| 5 | 6-nitro-1-amino-2-naphthol-4-sulphonic acid | 2-amino-5-naphthol-7-sulphonic acid | 4-methyl-2-aminophenol | 2-amino-8-naphthol-6-sulphonic acid | chloroacetyl chloride | black |
| 6 | 6-nitro-1-amino-2-naphthol-4-sulphonic acid | 2-amino-5-naphthol-7-sulphonic acid | 4-methoxy-2-aminophenol | 2-amino-8-naphthol-6-sulphonic acid | α,β-dibromo-propionyl chloride | blue-black |
| 7 | 6-nitro-1-amino-2-naphthol-4-sulphonic acid | 2-amino-5-naphthol-7-sulphonic acid | 4-nitro-2-amino-phenol-6-sulphonic acid | 2-amino-8-naphthol-6-sulphonic acid | α,β-dibromo-propionyl chloride | black |
| 8 | 6-nitro-1-amino-2-naphthol-4-sulphonic acid | 2-amino-5-naphthol-7-sulphonic acid | 6-nitro-2-amino-phenol-4-sulphonic acid | 2-amino-8-naphthol-6-sulphonic acid | α,β-dibromo-propionyl chloride | black |
| 9 | 6-nitro-1-amino-2-naphthol-4-sulphonic acid | 2-amino-5-naphthol-7-sulphonic acid | 4-chloro-2-amino-phenol-6-sulphonic acid | 2-amino-8-naphthol-6-sulphonic acid | α-bromoacrylyl-chloride | blue-black |
| 10 | 6-nitro-1-amino-2-naphthol-4-sulphonic acid | 2-amino-5-naphthol-7-sulphonic acid | 4-methoxy-2-aminophenol-5-sulphonic acid | 2-amino-8-naphthol-6-sulphonic acid | α,β-dibromo-propionyl chloride | blue-black |
| 11 | 6-nitro-1-amino-2-naphthol-4-sulphonic acid | 2-amino-5-naphthol-7-sulphonic acid | 4-chloro-2-amino-phenol | 2-amino-5-naphthol-7-sulphonic acid | α,β-dibromo-propionyl chloride | violet black |
| 12 | 6-nitro-1-amino-2-naphthol-4-sulphonic acid | 2-amino-5-naphthol-7-sulphonic acid | 4-nitro-2-amino-phenol | 2-amino-5-naphthol-7-sulphonic acid | α,β-dibromo-propionyl chloride | black |
| 13 | 6-nitro-1-amino-2-naphthol-4-sulphonic acid | 2-amino-5-naphthol-7-sulphonic acid | 5-nitro-2-amino-phenol | 2-amino-5-naphthol-7-sulphonic acid | α,β-dibromo-propionyl chloride | blue-black |
| 14 | 6-nitro-1-amino-2-naphthol-4-sulphonic acid | 2-amino-5-naphthol-7-sulphonic acid | 4,6-dinitro-2-aminophenol | 2-amino-5-naphthol-7-sulphonic acid | -60 , β-dibromo-propionyl chloride | black |
| 15 | 6-nitro-1-amino-2-naphthol-4-sulphonic acid | 2-amino-5-naphthol-7-sulphonic acid | 6-nitro-4-methyl-2-aminophenol | 2-amino-5-naphthol-7-sulphonic acid | α, β-dibromo-propionyl chloride | black |
| 16 | 6-nitro-1-amino-2-naphthol-4-sulphonic acid | 2-amino-5-naphthol-7-sulphonic acid | 4-methoxy-2-aminophenol | 2-amino-5-naphthol-7-sulphonic acid | chloroacetyl-chloride | blue-black |
| 17 | 6-nitro-1-amino-2-naphthol-4-sulphonic acid | 2-amino-5-naphthol-7-sulphonic acid | anthranilic acid | 2-amino-5-naphthol-7-sulphonic acid | chloroacetyl chloride | blue-black |
| 18 | 6-nitro-1-amino-2-naphthol-4-sulphonic acid | 2-amino-8-naphthol-6-sulphonic acid | 4-nitro-2-aminophenol | 2-amino-8-naphthol-6-sulphonic acid | α, β-dibromo-propionyl chloride | black |
| 19 | 6-nitro-1-amino-2-naphthol-4-sulphonic acid | 2-amino-8-naphthol-6-sulphonic acid | 4,6-dinitro-2-aminophenol | 2-amino-8-naphthol-6-sulphonic acid | α, β-dibromo-propionyl chloride | greenish-black |
| 20 | 6-nitro-1-amino-2-naphthol-4-sulphonic acid | 2-amino-8-naphthol-6-sulphonic acid | 6-nitro-2-amino-phenol-4-sulphonic acid | 2-amino-8-naphthol-6-sulphonic acid | α, β-dibromo-propionyl chloride | black |
| 21 | 6-nitro-1-amino-2-naphthol-4-sulphonic acid | 2-amino-8-naphthol-6-sulphonic acid | 4-nitro-2-amino-phenol | 2-amino-6-naphthol-8-sulphonic acid | α-bromo-acrylyl chloride | black |
| 22 | 6-nitro-1-amino-2-naphthol-4-sulphonic acid | 2-amino-8-naphthol-6-sulphonic acid | 4,6-dinitro-2-aminophenol | 2-amino-6-naphthol-8-sulphonic acid | α-bromo-acrylyl chloride | greenish-black |
| 23 | 6-nitro-1-amino-2-naphthol-4-sulphonic acid | 2-amino-8-naphthol-6-sulphonic | 6-nitro-2-amino-phenol-4-sulphonic acid | 2-amino-6-naphthol-8-sulphonic | α, β-dichloro-propionyl-chloride | black |

-continued

| No. | I | II | III | IV | |
|---|---|---|---|---|---|
| | acid | | acid | | |
| 24 | 6-nitro-1-amino-2-naphthol-4-sulphonic acid | 2-amino-5-naphthol-7-sulphonic acid | 4,6-dinitro-2-aminophenol | 1-amino-5-naphthol-7-sulphonic acid | chloroacetyl chloride | black |
| 25 | 6-nitro-1-amino-2-naphthol-4-sulphonic acid | 2-amino-5-naphthol-7-sulphonic acid | 4-chloro-2-aminophenol | 1-amino-5-naphthol-7-sulphonic acid | α,β-dibromo-propionyl-chloride | violet black |
| 26 | 6-nitro-1-amino-2-naphthol-4-sulphonic acid | 2-amino-5-naphthol-7-sulphonic acid | 4-nitro-2-aminophenol | 2-amino-8-naphthol-5-sulphonic acid | α,β-dibromo-propionyl-chloride | black |
| 27 | 6-nitro-1-amino-2-naphthol-4-sulphonic acid | 2-amino-5-naphthol-7-sulphonic acid | 6-nitro-4-methyl-2-aminophenol | 2-amino-8-naphthol-5-sulphonic acid | α,β-dibromo-propionyl-chloride | black |
| 28 | 1-amino-2-naphthol-4-sulphonic acid | 2-amino-5-naphthol-7-sulphonic acid | 4-chloro-2-aminophenol | 2-amino-5-naphthol-7-sulphonic acid | α,β-dibromo-propionyl-chloride | navy blue |
| 29 | 1-amino-2-naphthol-4-sulphonic acid | 2-amino-5-naphthol-7-sulphonic acid | 5-nitro-2-aminophenol | 2-amino-5-naphthol-7-sulphonic acid | α,β-dibromo-propionyl-chloride | navy blue |
| 30 | 1-amino-2-naphthol-4-sulphonic acid | 2-amino-5-naphthol-7-sulphonic acid | 4,6-dinitro-2-aminophenol | 2-amino-8-naphthol-6-sulphonic acid | α,β-dibromo-propionyl-chloride | black |
| 31 | 1-amino-2-naphthol-4-sulphonic acid | 2-amino-5-naphthol-7-sulphonic acid | 5-nitro-2-aminophenol | 2-amino-5-naphthol-7-sulphonic acid | α-bromoacryl chloride | navy blue |
| 32 | 1-amino-2-naphthol-4-sulphonic acid | 2-amino-5-naphthol-7-2-aminophenol sulphonic acid | 5-nitro-4-chloro-naphthol-7- | 2-amino-5-propionyl-sulphonic acid | α,β-dibromo-blue chloride | navy |
| 33 | 1-amino-2-naphthol-4-sulphonic acid | 2-amino-5-naphthol-7-sulphonic acid | 4-methoxy-2-aminophenol | 2-amino-5-naphthol-7-sulphonic acid | α,β-dibromo-propionyl-chloride | navy blue |
| 34 | 1-amino-2-naphthol-4-sulphonic acid | 2-amino-5-naphthol-7-sulphonic acid | 6-nitro-4-methyl-2-aminophenol | 2-amino-8-naphthol-6-sulphonic acid | α,β-dibromo-propionyl-chloride | black |
| 35 | 1-amino-2-naphthol-4-sulphonic acid | 2-amino-5-naphthol-7-sulphonic acid | 4,6-dinitro-2-aminophenol | 2-amino-8-naphthol-6-sulphonic acid | chloroacetyl chloride | black |
| 36 | 1-amino-2-naphthol-4-sulphonic acid | 2-amino-5-naphthol-7-sulphonic acid | 4-nitro-6-acetyl-amino-2-aminophenol | 2-amino-8-naphthol-6-sulphonic acid | α,β-dibromo-propionyl-chloride | black |
| 37 | 1-amino-2-naphthol-4-sulphonic acid | 2-amino-5-naphthol-7-sulphonic acid | 4-chloro-2-aminophenol | 1-amino-5-naphthol-7-sulphonic acid | α,β-dibromo-propionyl-chloride | navy blue |
| 38 | 1-amino-2-naphthol-4-sulphonic acid | 2-amino-5-naphthol-7-sulphonic acid | 5-nitro-4-chloro-2-aminophenol | 1-amino-5-naphthol-7-sulphonic acid | α,β-dibromo-propionyl-chloride | navy blue |

EXAMPLE 9

53.4 Parts of the 1:1 chromium complex of the monoazo dye from diazotised 6-nitro-1-amino-2-naphthol-4-sulphonic acid and 2-amino-5-naphthol-7-sulphonic acid and 40.4 parts of the monoazo dye from diazotised 4-nitro-2-aminobenzene and 2-amino-8-naphthol-6-sulphonic acid are suspended in 600 parts of water. This suspension is adjusted to a pH value of 8 to 9 by addition of a 2N solution of sodium hydroxide and reacted to give the homogeneous mixed complex by stirring for 1 hour at 90° to 95° C. The deep black reaction solution is cooled to 0° C. by the addition of ice and thereafter treated slowly with vigorous stirring, with 20 parts of trifluorotriazine while keeping a pH value of 6.5 to 7 by the dropwise addition of a dilute sodium hydroxide solution. As soon as the pH value no longer changes, the reaction mixture is treated with 24 parts of 2-toluidine and stirred to 40° C. with attendant rise in temperature until the pH value kept between 7 and 7.5 by the dropwise addition of dilute sodium hydroxide solution no longer changes.

The bisacylated mixed complex of the following constitution

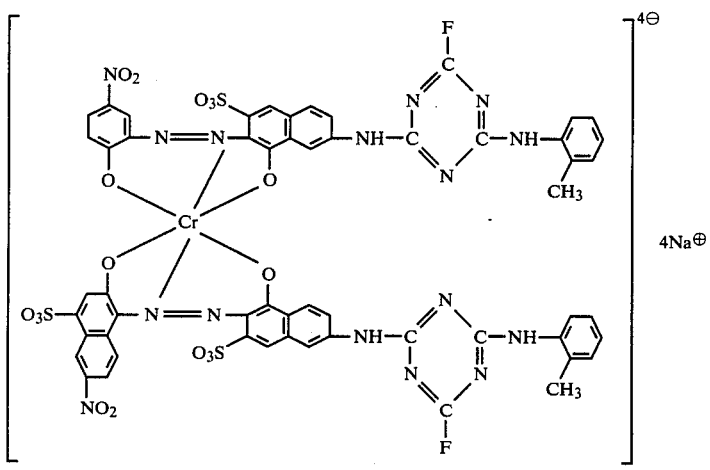

is precipitated from the solution by the addition of sodium chloride, isolated by filtration, washed with a dilute sodium chloride solution, and dried in vacuo at 60° to 70° C. The readily soluble dye gives full black shades of very good fastness properties on cotton fabric and shrinkproofed woollen fabric.

A black mixed complex of similar colouristic properties is obtained by bisacylating the mixed complex obtained from the reaction at a temperature of 20° to 25° C. with 36.5 parts of 5-chloro-2,4,6-trifluoropyrimidine while maintaining a pH of 6.5 to 7 and then isolating it by evaporation.

DYEING PROCEDURE 1

The following ingredients are dissolved in succession in 4000 parts of water of 50° C.: 4 parts of 80% acetic acid, 2 parts of the ammonium salt of the acid sulphuric acid ester of the adduct of a fatty amine (consisting of 30% of hexadecylamine, 25% of octadecylamine and 45% of octadecylamine and 7 moles of ethylene oxide) and 4 parts of ammonium sulphate. Then 8 parts of the dye obtained in Example 1 are dissolved hot in 100 parts of water and added to this dyebath. Then 100 parts of prewetted wool knitting yarn are put into the bath and the bath temperature is raised from 50° to 80° C. in the course of 30 minutes. After dyeing for 20 minutes at 80° C., the bath is heated to the boil and dyeing is subsequently carried out at the boil for 90 minutes. The dye exhausts almost completely onto the substrate. After the bath has been cooled to 80° C., the pH is raised from app. 4.5 to a constant 8.5 by adding ammonia solution and the goods are given an after-treatment for 20 minutes at this temperature. After a thorough rinsing with hot and cold water, acidifying with 1 part of 80% formic acid, centrifuging and drying, a deep black woollen yarn of very good wetfastness and fastness to rubbing and of excellent light-fastness is obtained.

DYEING PROCEDURE 2

A shrinkproofed woollen fabric is impregnated with the following preparation and squeezed out on a padder to a liquor pick-up of 250%.

```
  4    parts of Diaprint REG (acid-resistant thickener)
  1    part of sulphamic acid
  0.2  part of thymol
  0.2  part of emulsifier
```

-continued

```
 94.6 part of water
100   parts.
```

The impregnated material is subsequently brought into contact with a transfer paper carrying a printing design applied in the conventional manner with the dye of Example 3 and the transfer is effected in a heatable press for 3 minutes at 100° C. to 105° C., applying a pressure of approx. 0.5 kg/cm². After the woollen fabric has been rinsed and dried, it has a corresponding deep black printed design of very good fastness properties.

DYEING PROCEDURE 3

A chlorinated wool flannel fabric is impregnated with the following dye preparation and squeezed out to a 100% pickup:

```
  50  parts of the dye of Example 1
 300  parts of urea
 320  parts of Solvitose OFA, 4% (thickener)
  10  parts of a mixture of anionic fatty alcohol ether
      sulphate with non-ionogenic wetting agents
  10  parts of the leveller used in Example 1
  10  parts of sodium metabisulphate
  10  parts of 80% acetic acid
 280  parts of water
1000  parts of padding liquor.
```

The impregnated fabric is rolled up and packed airtight and subsequently stored for 48 hours at room temperature. After rinsing with cold water, the material is treated in a fresh bath with sufficient 24% ammonia to attain a pH value of 8.5 and kept for 15 minutes at 80° C. After rinsing to warm water, the fabric is acidified with 80% acetic acid and dried. The woollen fabric is dyed in a full black shade of excellent fastness properties.

DYEING PROCEDURE 4

2 Parts of the dye obtained in Example 9 are dissolved in 100 parts of water with the simultaneous addition of 0.5 part of sodium m-nitrobenzene-sulphonate. A cotton fabric is impregnated with the resultant solution to a liquor pick-up of 75% and then dried. The fabric is thereafter impregnated with a warm solution of 20° C. which contains, per liter, 5 g of sodium hydroxide and 300 g of sodium chloride, squeezed out to a pick-up of 75%, steamed for 30 seconds at 100° to 101° C., rinsed, soaped for a quarter of an hour in a 0.3% boiling solution of a non-ionic detergent, rinsed again, and dried.

DYEING PROCEDURE 5

2 Parts of the dye of Example 9 are dissolved in 100 parts of water. This solution is added to 1900 parts of cold water, 60 parts of sodium chloride are added and 100 parts of a cotton fabric are put into this dyebath. The temperature is raised to 40° C. and after 30 minutes 40 parts of calcined sodium carbonate and a further 60 parts of sodium chloride are added. The temperature is kept for 30 minutes at 40° C. and the dyeing is rinsed, then soaped for 15 minutes in a 0.3% boiling solution of a non-ionic detergent, rinsed again and dried.

What we claim is:

1. A process for dyeing or printing a substrate of cellulose or shrinkproofed wool, comprising the step of applying to the substrate a chromium complex dye of the formula

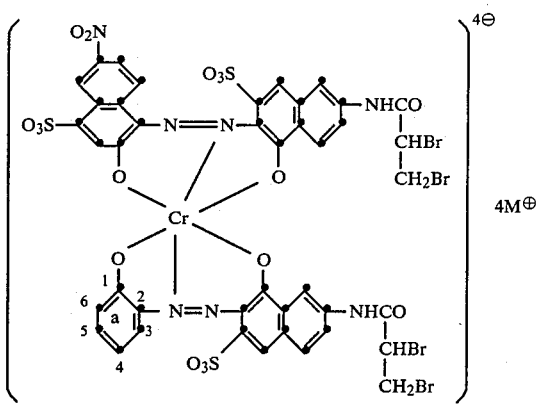

wherein the ring a is substituted by 4- or 5-nitro, and M is a cation.

2. The process of claim 1, wherein in the chromium complex dye the nitro substituent is in the 4-position.

3. Cellulose or shrinkproofed wool dyed or printed with a chromium complex dye of the formula

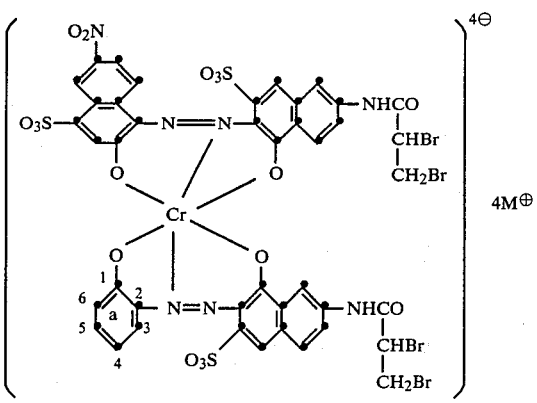

wherein the ring a is substituted 4- or 5-nitro, and M is a cation.

4. Cellulose or shrinkproofed wool dyed or printed with the chromium complex dye of claim 3, wherein the nitro substituent is in the 4-position.

* * * * *

UNITED STATES PATENT AND TRADEMARK OFFICE
CERTIFICATE OF CORRECTION

PATENT NO. : 4,502,865
DATED : Mar. 5, 1985
INVENTOR(S) : Gerhard Back, Fabio Beffa and Hans-Ulrich Schütz It is certified that error appears in the above-identified patent and that said Letters Patent is hereby corrected as shown below:

On the cover page under Foreign Application Priority Data the first line should read---

Jun. 24, -976 [CH] Switzerland......8086/76---

Signed and Sealed this

Nineteenth Day of November 1985

[SEAL]

Attest:

DONALD J. QUIGG

Attesting Officer

Commissioner of Patents and Trademarks